United States Patent
Bhanage et al.

(10) Patent No.: US 10,602,401 B2
(45) Date of Patent: *Mar. 24, 2020

(54) APPARATUS AND METHOD AGGREGATION AT ONE OR MORE LAYERS

(71) Applicant: Hewlett Packard Enterprise Development LP, Houston, TX (US)

(72) Inventors: Gautam Bhanage, Sunnyvale, CA (US); Sathish Damodaran, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 295 days.

This patent is subject to a terminal disclaimer.

(21) Appl. No.: 15/091,106

(22) Filed: Apr. 5, 2016

(65) Prior Publication Data
US 2016/0227438 A1    Aug. 4, 2016

Related U.S. Application Data

(63) Continuation of application No. 13/841,807, filed on Mar. 15, 2013, now Pat. No. 9,306,866.

(51) Int. Cl.
| | |
|---|---|
| *H04L 12/28* | (2006.01) |
| *H04W 28/06* | (2009.01) |
| *H04L 12/863* | (2013.01) |
| *H04W 84/12* | (2009.01) |
| *H04L 12/805* | (2013.01) |
| *H04L 12/26* | (2006.01) |

(52) U.S. Cl.
CPC ....... *H04W 28/065* (2013.01); *H04L 43/0882* (2013.01); *H04L 47/36* (2013.01); *H04L 47/625* (2013.01); *H04L 47/6215* (2013.01); *H04W 84/12* (2013.01)

(58) Field of Classification Search
CPC ....... H04L 49/90; H04L 49/254; H04L 47/50; H04L 49/3045; H04L 49/30
See application file for complete search history.

(56) References Cited

U.S. PATENT DOCUMENTS

| | | | |
|---|---|---|---|
| 6,134,217 A | 10/2000 | Stiliadis et al. | |
| 7,529,242 B1 | 5/2009 | Lyle | |
| 2005/0053066 A1* | 3/2005 | Famolari | ............ H04L 12/6418 370/389 |

(Continued)

*Primary Examiner* — Un C Cho
*Assistant Examiner* — Atique Ahmed
(74) *Attorney, Agent, or Firm* — Hewlett Packard Enterprise Patent Department (57) ABSTRACT

A method for performing aggregation at one or more layers starts with an AP placing at a first layer one or more received frames in a queue at the AP. When a transmit scheduler is ready to transmit an aggregated frame corresponding to the queue, the AP may iteratively select a plurality of frames selected from the one or more received frames, and aggregate at the first layer the plurality of frames into the aggregated frame. The number of frames included in an aggregated frame may be based on at least one of: a dynamically updated rate of transmission associated with a size of the frames, a class of the frames, a transmission opportunity value associated with the class of the frames and a total projected airtime for transmitting the aggregated frame. Other embodiments are also described.

12 Claims, 4 Drawing Sheets

(56) References Cited

U.S. PATENT DOCUMENTS

| | | | |
|---|---|---|---|
| 2005/0099979 A1* | 5/2005 | Chandra | H04L 47/14 370/338 |
| 2005/0135284 A1* | 6/2005 | Nanda | H04L 29/06068 370/294 |
| 2005/0135295 A1* | 6/2005 | Walton | H04W 74/00 370/328 |
| 2005/0135318 A1* | 6/2005 | Walton | H04L 12/66 370/338 |
| 2006/0083168 A1 | 4/2006 | Prakash | |
| 2006/0221879 A1* | 10/2006 | Nakajima | H04W 74/0808 370/310 |
| 2007/0036116 A1* | 2/2007 | Eiger | H04L 47/10 370/338 |
| 2007/0042715 A1* | 2/2007 | Salo | H04B 1/1027 455/63.4 |
| 2007/0153745 A1 | 7/2007 | Sun et al. | |
| 2007/0230493 A1* | 10/2007 | Dravida | H04L 47/621 370/412 |
| 2007/0249360 A1 | 10/2007 | Das | |
| 2007/0286149 A1* | 12/2007 | Yamamoto | H04W 72/1263 370/345 |
| 2008/0144586 A1 | 6/2008 | Kneckt et al. | |
| 2009/0232001 A1* | 9/2009 | Gong | H04L 47/10 370/236 |
| 2011/0019557 A1 | 1/2011 | Hassan et al. | |
| 2011/0058473 A1 | 3/2011 | Krym et al. | |
| 2013/0322456 A1* | 12/2013 | Ito | H04L 7/04 370/400 |
| 2014/0079016 A1* | 3/2014 | Dai | H04L 5/0041 370/330 |
| 2014/0269752 A1 | 9/2014 | Bhanage et al. | |
| 2014/0269766 A1 | 9/2014 | Gopalasetty et al. | |

* cited by examiner

APPARATUS AND METHOD AGGREGATION AT ONE OR MORE LAYERS

PRIOTITY APPLICATION INFORMATION

This application is a continuation of U.S. application Ser. No. 13/841,807 filed Mar. 15, 2013, the contents of which are incorporated herein by reference.

FIELD

Embodiments of the invention relate generally to apparatuses and methods for aggregation at one or more layers to yield superior data transmission performance.

BACKGROUND

Currently, when aggregating a plurality of packets into an aggregated packet at the various layers, the number of packets to be aggregated into a single aggregated packet is predetermined (i.e., static approach to aggregation).

The selection of the number of packets to be aggregated greatly affects the transmission rate, the amount of overhead, and the airtime required to transmit the packet. For instance, if the predetermined number of packets to be aggregated is too small, while the transmission rate may be higher, it also results in a higher packing overhead since each aggregated packet may include an error (CRC) check. Alternatively, if the predetermined number of packets is too large, while the packing overhead is reduced, the transmission rate is lowered to ensure that the large aggregated packet may be transmitted without error. If errors were to occur or if the transmission of the aggregated packet were to fail due to interference or a low signal-to-noise ratio (SNR) at the receiver, since the aggregated packet includes a single error (CRC) check, the retransmission would render the link performance to be suboptimal.

SUMMARY

In order to improve the aggregation at by access points (AP), the present invention proposes that an AP perform aggregation separately at the MAC Service Data Unit (MSDU) layer and at the MAC Protocol Data Unit (MPDU) layer to address separate problems. Specifically, the aggregation at the MSDU layer addresses efficiency by dynamically determining the depth of the aggregation based on a feedback from the rate control module while the aggregation at the MPDU layer addresses traffic differentiation. It is contemplated that aggregation may be performed at one or more of the layers (e.g., MSDU and/or MPDU layers).

In some embodiment, a method for aggregation at one or more layers starts with an access point (AP) placing at a first layer one or more received frames in a queue at the AP. When a transmit scheduler is ready to transmit an aggregated frame corresponding to the queue, the AP may iteratively select a plurality of frames selected from the one or more received frames, and aggregate at the first layer the plurality of frames into the aggregated frame. The number of frames included in an aggregated frame may be based on at least one of: a dynamically updated rate of transmission associated with a size of the frames, a class of the frames, a transmission opportunity value associated with the class of the frames and a total projected airtime for transmitting the aggregated frame.

An apparatus for aggregation at one or more layers may comprise a storage to store instructions, a processor to execute the instructions, and an interface to communicate with a plurality of client devices. The interface may receive at a first layer one or more frames, and place the received frames in a queue. In one embodiment, executing the instructions causes the processor to aggregate at the first layer, when a transmit scheduler is ready to transmit an aggregated frame corresponding to the queue, a plurality of frames into an aggregated frame. This aggregation may be performed iteratively until the remaining frames in the queue cannot be further aggregated. The number of frames included in an aggregated frame is based on at least one of: a dynamically updated rate of transmission associated with a size of the frames, a class of the frames, a transmission opportunity value associated with the class of the frames and a total projected airtime for transmitting the aggregated frame.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
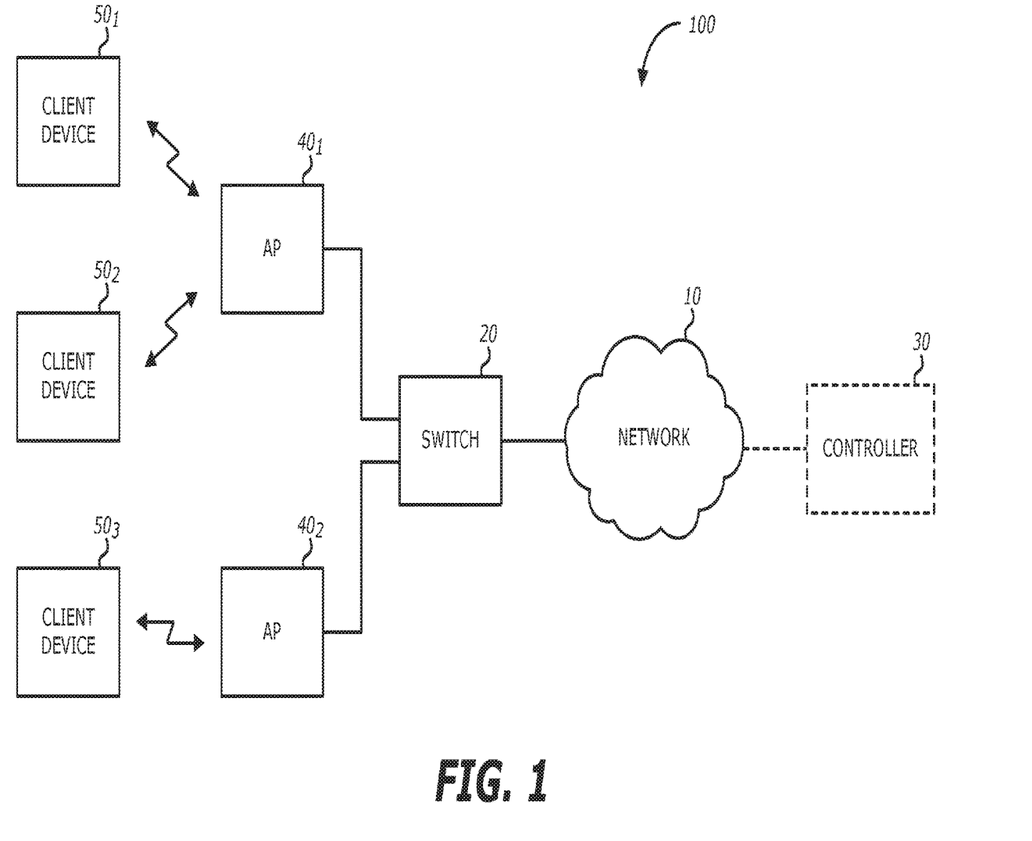
FIG. 1 shows a block diagram of the components of the network system in which an embodiment of the invention may be implemented.

FIG. 1 shows a block diagram of the components of the network system in which an embodiment of the invention may be implemented. In FIG. 1, the network system 100 includes a trusted and/or un-trusted network 10 coupled to an Ethernet switch 20. In one embodiment, the network 10 may be coupled to at least one controller 30. The network 10 may be a wireless network operating according to 802.11 standards (WiFi or Wireless Local Area Network, WLAN, IEEE 802.11ac, IEEE 802.11n). The network 10 may also be a wired network (e.g., IEEE 802.3, etc.) that is connected to the Ethernet switch 20 and/or the controller 30. In some embodiments, the Ethernet switch 20 is an Ethernet switch having a plurality of physical ports. For instance, the physical ports may be Gigabit Ethernet (GE) physical ports.

In one embodiment, the system 100 includes a plurality of access points (AP) $40_1$-$40_n$ (n>1) and a plurality of client devices $50_1$-$50_m$ (m>1). In the embodiment as shown in FIG. 1, the system 100 includes an AP $40_1$ that is coupled to two client devices $50_1$-$50_2$ and another AP $40_2$ that is coupled to one client device $50_3$. The AP 40 may be an IEEE 802.11 AP that includes two GE uplinks. As shown in FIG. 1, the switch 20 may be coupled to the AP 40 via the two GE uplinks. In this example, the switch 20 may include two GE physical ports that are respectively connected to the AP 40 via the two GE uplinks, respectively. Each of the links may provide a throughput of up to 1 GB. The APs $40_1$-$40_2$ to provide access to the network 10 to the client devices $50_1$-$50_3$ with which the APs $40_1$-$40_2$ are coupled. The connection between the APs $40_1$-$40_2$ and the client devices $50_1$-$50_3$ may be a wired connection or a wireless connection. The client devices $50_1$-$50_3$ may be wireless devices or wired devices. For instance, the client devices $50_1$-$50_3$ may be consumer electronic devices such as a general-purpose computer, a laptop computer, a mobile telephone communications device having data capabilities (e.g., smartphones), a tablet computer, and a personal digital media player.

In one embodiment, the controller 30 may provide support to the APs $40_1$-$40_2$. For instance, in some embodiments, the controller 30 may maintain configurations, automates updates for the APs $40_1$-$40_2$, provides network protection (e.g., firewall, wireless intrusion protection, secure remote connections, etc) as well as optimize radio connections.

Figure 2:
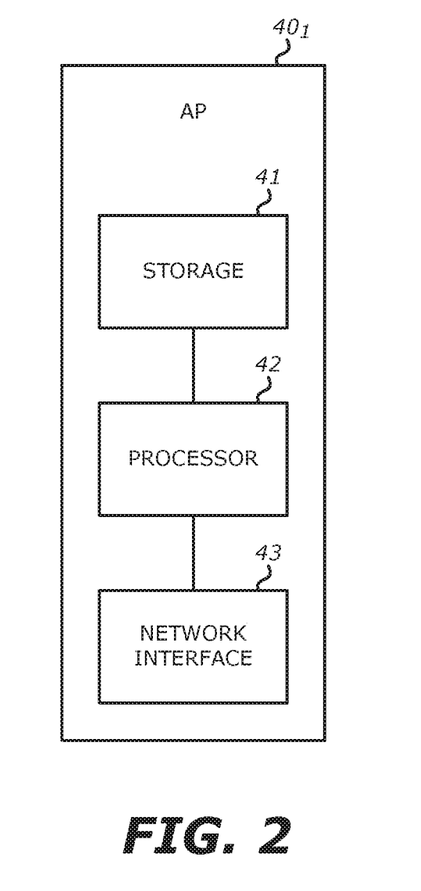
FIG. 2 shows a block diagram of the details of one of the components of the network system in which an embodiment of the invention may be implemented.

FIG. 2 shows a block diagram of the details an AP of the network system in which an embodiment of the invention may be implemented. In this embodiment, the AP $40_1$ is a purpose-build digital device that comprises data storage 41, a processor 42, and a network interface 43.

The data storage 41 of the AP $40_1$ may include a fast read-write memory for storing programs and data during the AP $40_1$'s operations and a hierarchy of persistent memory such as ROM, EPROM, and Flash memory for storing instructions and data needed for the AP $40_1$'s startup and a file system for the AP $40_1$'s operations.

The network interface 43 may include a wired network interface such as an IEEE 802.3 Ethernet interface as well as a wireless interface such as an IEEE 802.11 WiFi interface (e.g., 802.11ac interface). In the embodiment illustrated in FIG. 1, the IEEE 802.11ac interface included in network interface 43 is connected to the Ethernet switch 20 via two separate links (e.g., 2 Gigabit Ethernet (GE) uplinks). Each of the links provides a throughput of up to 1 GB and is connected to a separate physical port of the AP $40_1$. In FIG. 1, the network interface 43 of $AP_1$ is connected to client devices $50_1$-$50_2$ to receive frames to be transmitted to each other or other client devices (e.g., $50_3$). The frames may be of different access categories or classes (e.g., similar to the classes in 802.11e voice, video, best effort, and background).

As shown in FIG. 2, the processor 42 is coupled to the data storage 41 and the network interface 43. The processor 42 may be any processing device including, but not limited or restricted to a MIPS-class processor, a microprocessor, a digital signal processor, an application specific integrated circuit, a microcontroller, a state machine, or any type of programmable logic array. In one embodiment, the AP $40_1$ may operate under the control of software or an operating system (OS), such as Linux, running specific programs to provide for controller operation. The operating system may be stored in the data storage 41 and executed by the processor 42 to cause the AP $40_1$ to perform AP operations.

Figure 3:
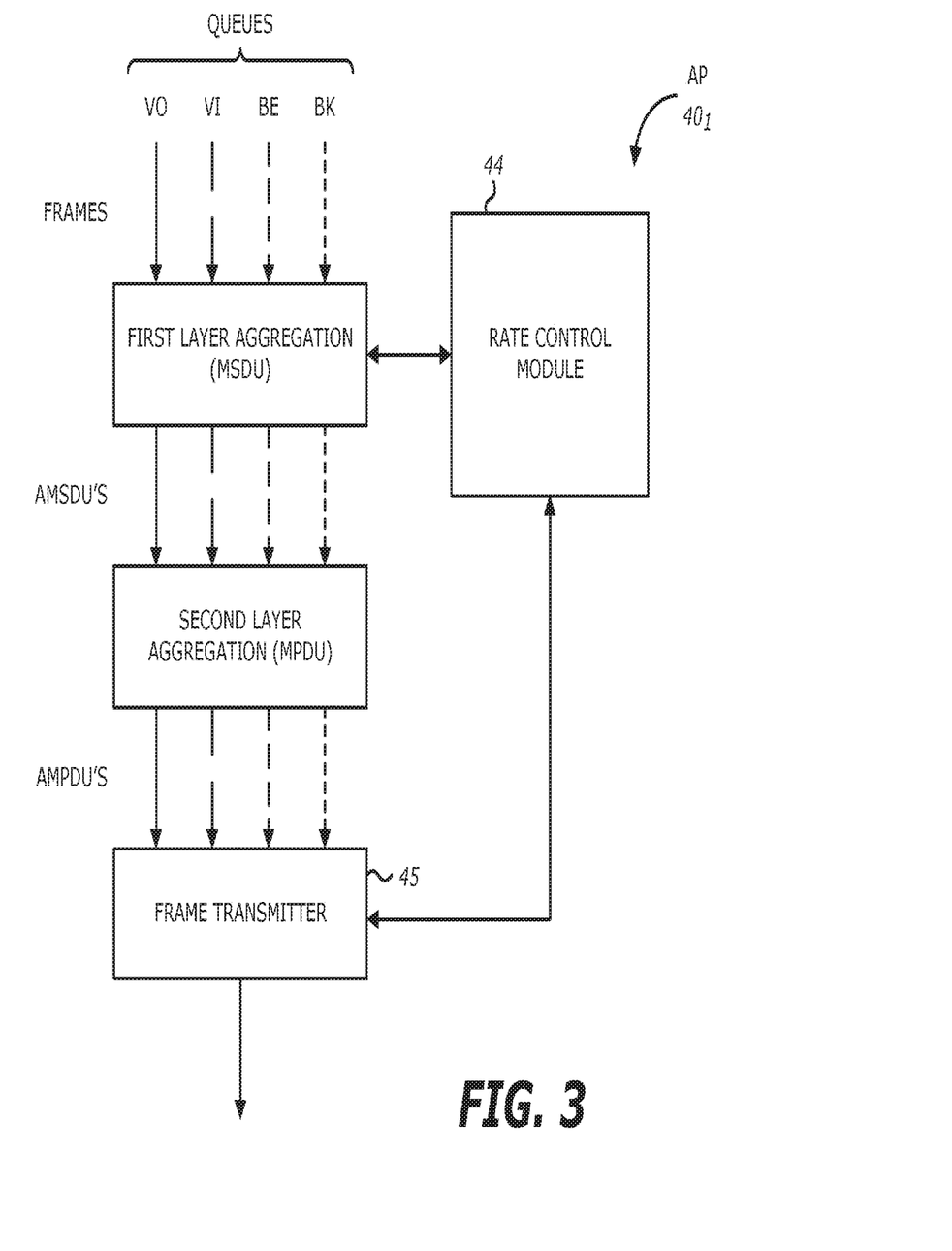
FIG. 3 illustrates a block diagram of an access point performing aggregation at one or more layers according to one embodiment of the invention.

FIG. 3 illustrates a block diagram of an access point performing aggregation at one or more layers according to one embodiment of the invention. In this embodiment, the first layer is the MAC Service Data Unit (MSDU) layer. At the MSDU layer, the network interface 43 may receive MSDU frames that are from different categories or classes. As shown in FIG. 3, the classes (of traffic) may include, for instance, voice, video, best effort, and background. The MSDU frames are unaggregated frames that may be queued into different classes such that each of the classes of traffic may have a separate queue. In some embodiments, a separate layer before the MSDU layer is included in the AP $40_1$ that organizes the MSDU frames into separate queues according to the class associated with each of the MSDU frames. In one embodiment, the aggregation at the MSDU layer is performed only when a predetermined amount of backlog is detected by the processor 42 in a given class queue of MSDU frames.

As shown in FIG. 3, the MSDU aggregation layer may be communicatively coupled to a rate control module 44 that stores a rate control table. In one embodiment, the rate control module 44 is included in the AP $40_1$. The rate control table may include a vector for each client link associated with the AP $40_1$. The vector may include buckets (or ranges) of frame sizes (bucket[i]) and a fastest rate of transmission associated with each of the buckets of frame sizes (rate (bucket[i])) (i>0). Accordingly, the rate control table may be a 2-dimensional matrix. For example, for a given client device $50_1$ on a given client link, the rate control table may include as an entry:

| Buckets (bucket[i]) | Fastest Rate (rate(bucket[i])) |
|---|---|
| 0-200 bytes | 100 MB/s |
| 201-400 bytes | 80 MB/s |
| 401-600 bytes | 60 MB/s |
| 601-800 bytes | 60 MB/s |
| 801-1000 bytes | 60 MB/s |
| 1001-1200 bytes | 60 MB/s |

In one embodiment, for different buckets of frame sizes, the rate control table indicates, as the fastest rate (rate (bucket[i])), the last rate that was used to best reach the client device $50_1$ on the client link. The fastest rate (rate (bucket[i])) may be used as an indicator of the fastest rate with which the AP $40_1$ can send a frame of that size to that client device $50_1$. In one embodiment, the rate control module is provided a test frame of a given size and sends the test frame to the client to determine the highest rate of transmission that will result in the test frame being sent without errors.

Using the fastest rate (rate(bucket[i])) of transmission obtained from the rate control table, the processor 42 at the MSDU layer may determine the optimal AMSDU size (e.g., the number of MSDUs to be aggregated into a single AMSDU). If the AMSDU size is too small, while the small sized AMSDU may be transmitted at a faster rate, the disadvantage is that there will be a higher packing overhead, since there is an error (CRC) check for each AMSDU. If the AMSDU size is too large, while the packing overhead is reduced, the disadvantage is that the larger sized AMSDU may be transmitted at a slower rate. If the larger-sized AMSDU were to be transmitted at the same rate as the small-sized AMSDU, the probability of errors increases and the need to retransmit the larger sized AMSDU will consume further airtime.

In one example, if the rate control table includes known rates for k AMSDU sizes (k>1), the processor 42 may iterate over each bucket of frame sizes (bucket[i]) and determine the airtime associated with each AMSDU size with an optimal AMPDU size. In one embodiment, the airtime associated with each AMSDU size (and with each bucket of frame sizes) may be calculated using the following formula:

$$\text{airtime(bucket}[i]) = \frac{\text{size(bucket}[i])}{\text{rate(bucket}[i])} + \frac{\text{ampdusize(class(bucket}[i])) * \text{OverheadPerMPDU}}{\text{size(bucket}[i])}$$

The processor 42 may apply this formula on a per AMSDU basis or on an $n^{th}$ AMSDU basis (n>1). Using the above formula for airtime (airtime(bucket[i])) and the rate control table example above, if a voice frame that is received is 512 bytes in size, the rate of transmission obtained for this voice frame is 60 MB/s because the 512 bytes in size falls within the bucket including frame sizes 401 to 600 bytes. Thus, in this example:

| size (bucket[i]) | Fastest Rate (rate(bucket[i])) |
|---|---|
| 512 bytes | 60 MB/s |

The airtime (that does not account for overhead) to transmit the frame is obtained by dividing the size of the frames (size(bucket[i])) by the transmission rate (rate(bucket[i])). In this example, the airtime (that does not account for overhead) is 512 bytes divided by 60 MB/s.

To obtain a more accurate airtime (airtime(bucket[i])), the above formula further accounts for the overhead per MPDU in the AMPDU. This overhead provides a cost of aggregation at the MPDU layer. In this embodiment, this overhead is calculated by the processor 42 multiplying the AMPDU size for a given class of frames (e.g., in this example: voice) by the known overhead per MPDU and dividing that result by the size of the frame (airtime(bucket[i])).

In this embodiment, by iterating over all of the buckets (bucket[i]), it is possible to obtain the bucket (bucket[i]) or AMSDU size that will result in the minimum airtime consumption with minimal number of retransmissions. Thus, MSDU aggregation may be performed dynamically based on the rate of transmission obtained from the rate control module.

Thus, the optimal AMSDU size obtained by the processor 42 for a given class dictates the number of MSDU frames of the given class to be aggregated into an AMSDU of that given class. For example, having obtained the optimal AMSDU size for a voice AMSDU, the AP may aggregate at the MSDU layer the number of voice MSDU frames into one voice AMSDU of the optimal size.

In one embodiment, the processor 42 may skip the aggregation performed at the MSDU layer if the rates of transmission (rate(bucket[i])) included in the rate control table are determined to be similar across the different buckets of frame sizes (bucket[i]). For instance, in one embodiment, the processor 42 may determine if the difference between the rate of transmissions (rate(bucket[i])) are greater than a given threshold and performs the aggregation at the MSDU layer if the difference is greater than the given threshold. In this embodiment, if the difference is not greater than the given threshold, the processor 42 may skip the aggregation at the MSDU layer and may select the largest bucket size (size(bucket[i])).

In the embodiment illustrated in FIG. 3, the second layer is the MAC Protocol Data Unit (MPDU) layer. At the MPDU layer, the network interface 43 may receive MPDU frames that are from different categories or classes. As shown in FIG. 3, the classes (of traffic) may include, for instance, voice, video, best effort, and background. The MPDU frames may be queued into different classes such that each of the classes of traffic may have a separate queue. In one embodiment, each of the voice MPDU frames may include a voice Aggregated MSDU frames (AMSDUs). In one embodiment, the aggregation at the MPDU layer is performed only when a predetermined amount of backlog is detected by the processor 42 in a given class queue of MPDU frames.

In the MPDU layer, the aggregation performed by the processor 42 may achieve Quality of Service (QoS) across different access categories or classes. A transmission opportunity (TxOp) that establishes the amount of time that the transmission medium may be occupied by a transmission of a packet of every access category or class. For example, the voice class may be associated with a transmission opportunity of 2000 ms, the video class may be associated with a transmission opportunity of 1000 ms, and the best effort and background classes may be associated with not reserved amount of time. In some embodiments, the time values delineated by the transmission opportunity (TxOp) may be customized for every WiFi deployment. In other embodiments, the time values delineated by the transmission opportunity (TxOp) are standard values. Accordingly, in one embodiment of the invention, the aggregation at the MPDU layer includes aggregating the highest number of MPDUs of a given priority class (e.g., voice and video) in an AMPDU of that given priority class in order to completely saturate the amount of time allotted by the transmission opportunity (TxOp) associated with that given priority class. In one embodiment, the processor 42 starts with the highest priority class and determines the highest number of MPDU of that class t using the following equation:

$$NumMPDUs[t] = \frac{TxOp(\text{class}(AMSDU[t]))}{\text{airtime}(\text{size}(AMSDU[t]))}$$

In this embodiment, the MPDU aggregation is based on the transmission opportunity (TxOp) associated with a given class t and the total projected airtime for transmitting an AMSDU of that class t. The projected airtime (airtime(size (AMSDU[t]))) may be based on the size of the AMSDU of that class t. In one embodiment, the projected airtime (airtime(size(AMSDU[t]))) is an estimate that may be available within a driver included in the AP $40_1$. In another embodiment, the projected airtime (airtime(size(AMSDU [t]))) is the last known airtime to send an AMSDU of that class t of that size.

The processor 42 may calculate the number of MPDUs of that class t using the equation above. The processor 42 may apply this equation on a per AMSDU basis or on an $n^{th}$ AMSDU basis (n>1). For example, if the highest priority class is the voice class, the processor 42 calculates the number of voice MPDUs to be included into an aggregated MPDU (AMPDU). In one embodiment, using the equation above, the processor 42 then calculates the highest number of MPDU of the second highest priority class (e.g., video) and the MPDU of the third highest priority class etc. . . . By completely saturating the amounts of time allotted by the transmission opportunity (TxOp) of the classes, the aggregation at the MPDU layer generates good traffic differentiation while being compliant with the transmission opportunity (TxOp) established.

As shown in FIG. 3, the AMPDUs are received by a frame transmitter 45 which may be coupled to the network interface 43 to transmit the AMPDUs to the Ethernet switch 20. The frame transmitter 45 may also be coupled to the rate control module 44 to update the contents of the rate control table. In one embodiment, the frame transmitter 45 and the rate control module 44 receive signals from the processor 42 to control their functions.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
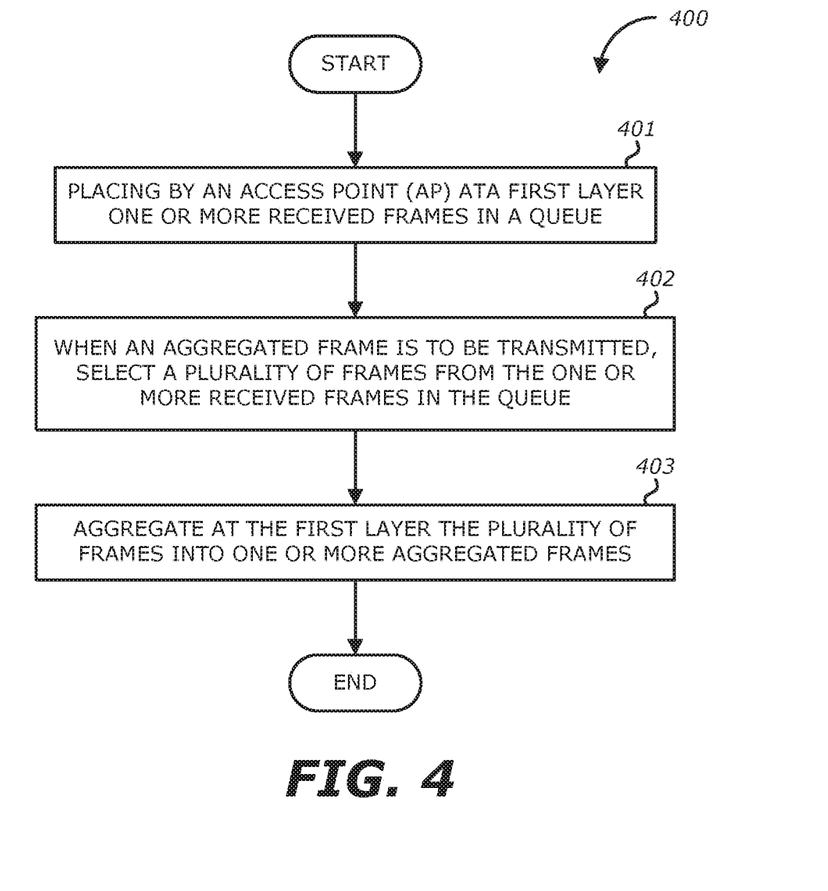
FIG. 4 shows a flow diagram of an example method for aggregation at one or more layers according to one embodiment of the invention.

FIG. 4 shows a flow diagram of an example method of performing aggregation at one or more layers according to one embodiment of the invention. The Method of 400 starts with an AP placing at a first layer one or more received frames in a queue (Block 401). At Block 402, when an aggregated frame is to be transmitted, the AP may select a plurality of frames from the one or more received frames in the queue. At Block 403, the AP then aggregate at the first layer the plurality of frames into one or more aggregated frames. The number of frames included in an aggregated frame is based on at least one of: a dynamically updated rate of transmission associated with a size of the frames, a class of the frames, a transmission opportunity value associated with the class of the frames and a total projected airtime for transmitting the aggregated frame. In one embodiment, the frames may be from different classes including a first class, and the queue of frames may be associated with the first class.

In one embodiment, the first layer is a MAC Service Data Unit (MSDU) layer and the plurality of frames is a plurality of MSDU frames. In this embodiment, the MSDU frames may be from different classes including the first class. The AP may aggregate at the MSDU layer a plurality of first class MSDU frames into a plurality of first class Aggregated MSDU frames (AMSDUs). Each of the first class AMSDUs may include a number of first class MSDU frames that is based on a first class rate of transmission associated with a size of the first class MSDU frames.

In one embodiment, the AP in method 400 further receives at a second layer a plurality of second layer frames that include a plurality of first class AMSDU frames. Each of the first class second layer frames may include one of the plurality of first class AMSDU frames. In this embodiment, the second layer is a MAC Protocol Data Unit (MPDU) layer and the second layer frames are MPDU frames. In this embodiment, the AP aggregates at the MPDU layer the plurality of first class MPDU frames into a plurality of first class aggregated MPDU frame (AMPDUs). Each of the first class AMPDUs may include a number of first class MPDU frames that is based on a transmission opportunity value associated with the first class and a total projected airtime for transmitting the first class AMSDU. The total projected airtime may be based on the size of the first class AMSDU.

In another embodiment, the first layer described in FIG. 4 is a MAC Protocol Data Unit (MPDU) layer and the plurality of frames is a plurality of MPDU frames. The plurality of MPDU frames may include a plurality of first class MPDU frames. Each of the first class MPDU frames may include one of the plurality of first class AMSDUs. In this embodiment, the AP aggregates at the MPDU layer the plurality of first class MPDU frames into a plurality of first class aggregated MPDU frame (AMPDUs). Each of the first class AMPDUs may include a number of first class MPDU frames that is based on a transmission opportunity value associated with the first class and a total projected airtime for transmitting packets included in the first class AMPDU. The total projected airtime may be based on the size of the packets included in the first class AMPDU. In one embodiment, the packets included in the first class AMPDU are first class AMSDU, where each of the first class MPDU frames may include a first class AMSDU.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method comprising:
receiving, by an access point (AP) at a first layer, a frame;
detecting, by the AP, a predetermined amount of backlog in a queue; and
in response to detecting the predetermined amount of backlog in the queue, aggregating a determined quantity of frames into an aggregated frame by:
determining the quantity of frames to aggregate into the aggregated frame;
selecting a plurality of frames from the queue based on the determined quantity of frames; and
aggregating, by the AP at a first layer, the selected plurality of frames into the aggregated frame, wherein the determined quantity of frames to aggregate into the aggregated frame is based on a transmission opportunity value of a class of the selected plurality of frames from the queue of frames corresponding to the class; and a total projected airtime for transmitting the aggregated frame, wherein the projected airtime is an airtime to send a previous aggregated frame of the class of the selected plurality of frames.

2. The method of claim 1, including receiving, by the AP at the first layer, the frame, and wherein the first layer is a MAC Service Data Unit (MSDU) layer.

3. The method of claim 1, including placing, the frame in the queue of a plurality of queues, each of the queues corresponding to a different class of a plurality of classes of frames.

4. The method of claim 1, wherein the determined quantity of frames is based on the transmission opportunity of a voice class of the selected plurality of frames from the queue.

5. The method of claim 1, wherein the determined quantity of frames is based on an amount of time that a transmission medium may be occupied by a transmission of a packet of the class.

6. The method of claim 3, wherein the plurality of classes includes a first class, and wherein the queue is associated with the first class.

7. An access point (AP), comprising:
a queue;
a processor; and
a memory resource having instructions stored thereon that when executed by the processor are to form a rate control module, the rate control module to:
detect a predetermined amount of backlog in the queue;
in response to detecting the predetermined amount of backlog in the queue, aggregating a determined quantity of frames into an aggregated frame by:
determining the quantity of frames to aggregate into the aggregated frame;
selecting a plurality of frames from the queue based on the determined quantity of frames; and
aggregating, at a first layer, the selected plurality of frames into the aggregated frame, wherein the determined quantity of frames to aggregate into the aggregated frame is based on a transmission opportunity value of a class of the selected plurality of frames from the queue of frames corresponding to the class; and a total projected airtime for transmitting the aggregated frame, wherein the projected airtime is an airtime to send a previous aggregated frame of the class of the selected plurality of frames.

8. The AP of claim 7, wherein the rate control module stores a rate control table including a vector for each client link associated with the AP.

9. The AP of claim 7, wherein the rate control module is to iteratively select the plurality of frames from the queue based on the determined quantity of frames.

10. An apparatus comprising:
a storage to store instructions;
an interface to communicate with a plurality of client devices, the interface to receive at a first layer a frame; and
a processor to execute the instructions, wherein executing the instructions causes the processor to:
place the received frame in a queue of a plurality of queues;
detect a predetermined amount of backlog in the queue; and
in response to a detection of the predetermined amount of backlog in the queue, aggregate a determined quantity of frames into an aggregated frame, wherein to aggregate the processor is to:
determine the quantity of frames to aggregate into the aggregated frame;
select a plurality of frames from the queue based on the determined quantity of frames; and
aggregate at the first layer the selected plurality of frames into the aggregated frame, wherein the determined quantity of frames to aggregate into the aggregated frame is based on a transmission opportunity value of a class of the selected plurality of frames from the queue of frames corresponding to the class; and a total projected airtime for transmitting the aggregated frame, wherein the projected airtime is an airtime to send a previous aggregated frame of the class of the selected plurality of frames.

11. The apparatus of claim 10, wherein a plurality of classes includes the class, and wherein the queue is associated with the class.

12. The apparatus of claim 11, wherein to receive the frame, the processor is to receive at the first layer the plurality of classes first layer frames (1L frames), and wherein to aggregate at the first layer the selected plurality of frames into the aggregated frame, the processor is to aggregate at the first layer the plurality of classes 1L frames from the associated class queue, into a plurality of classes Aggregated first layer frames (A1L frames).

* * * * *